United States Patent
Mukherjee (10) Patent No.: US 11,086,765 B2
(45) Date of Patent: Aug. 10, 2021

(54) TEST REUSE EXCHANGE AND AUTOMATION SYSTEM AND METHOD

(71) Applicant: JPMorgan Chase Bank, N.A., New York, NY (US)

(72) Inventor: Vivek Mukherjee, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/266,514

(22) Filed: Feb. 4, 2019

(65) Prior Publication Data
US 2019/0243750 A1   Aug. 8, 2019

Related U.S. Application Data

(60) Provisional application No. 62/625,731, filed on Feb. 2, 2018.

(51) Int. Cl.
*G06F 9/44* (2018.01)
*G06F 9/445* (2018.01)
*G06F 11/36* (2006.01)

(52) U.S. Cl.
CPC ...... *G06F 11/3684* (2013.01); *G06F 11/3664* (2013.01); *G06F 11/3688* (2013.01); *G06F 11/3692* (2013.01)

(58) Field of Classification Search
CPC ............. G06F 11/3684; G06F 11/3664; G06F 11/3688; G06F 11/3692
See application file for complete search history.

(56) References Cited

U.S. PATENT DOCUMENTS

| | | | |
|---|---|---|---|
| 7,490,319 B2* | 2/2009 | Blackwell | G06F 11/3664 717/124 |
| 9,798,650 B1* | 10/2017 | Verma | G06F 11/362 |
| 9,898,396 B2* | 2/2018 | Owen | G06F 11/3688 |
| 2010/0153780 A1* | 6/2010 | Kirtkow | G06F 11/3684 714/37 |
| 2012/0102450 A1* | 4/2012 | Choudhary | G06F 8/77 717/101 |
| 2012/0150820 A1* | 6/2012 | Sankaranarayanan | G06F 16/215 707/690 |
| 2012/0260129 A1* | 10/2012 | Wilson | G06F 11/3688 714/32 |

(Continued)

OTHER PUBLICATIONS

Sophia Segal, User Acceptance Testing and the Application Lifecycle, 2017, pp. 1-28. https://www.red-gate.com/simple-talk/dotnet/net-development/user-acceptance-testing-application-lifecycle/(Year: 2017).*

(Continued)

*Primary Examiner* — Mongbao Nguyen
(74) *Attorney, Agent, or Firm* — Greenblum & Bernstein, P.L.C.

(57) ABSTRACT

Systems and methods for creating, modifying, and executing user acceptance testing are provided. The systems and methods may employ a repository of test cases which a user can copy and edit to produce user acceptance test plans. The system and method may provide auto-generated software feature files, skeletal test code and test parameters to an automation server which can executes the user acceptance test plans. The results of the tests may be provided to the user via a user interface.

20 Claims, 7 Drawing Sheets

(56) References Cited

U.S. PATENT DOCUMENTS

| | | | |
|---|---|---|---|
| 2015/0242304 A1* | 8/2015 | Akbulut | G06F 3/04842 |
| | | | 714/38.1 |
| 2015/0286556 A1* | 10/2015 | Ellis | G06F 11/3684 |
| | | | 717/125 |
| 2016/0055079 A1* | 2/2016 | Hanna | G06F 11/3692 |
| | | | 717/135 |
| 2016/0342501 A1* | 11/2016 | Venkatesan | G06F 11/3688 |
| 2017/0139817 A1* | 5/2017 | Bassin | G06F 8/70 |
| 2017/0185509 A1* | 6/2017 | Arkadyev | G06F 11/3696 |
| 2017/0199810 A1* | 7/2017 | Hamilton, II | G06F 11/3672 |
| 2017/0300405 A1* | 10/2017 | Yashayeva | G06F 11/3692 |
| 2018/0089066 A1* | 3/2018 | Barnett | G06F 11/3684 |
| 2018/0144279 A1* | 5/2018 | Yao | G06Q 10/06313 |
| 2018/0314625 A1* | 11/2018 | Schuller | G06F 11/3664 |
| 2019/0042400 A1* | 2/2019 | Surace | G06F 11/3664 |
| 2019/0129712 A1* | 5/2019 | Hawrylo | G06F 8/71 |
| 2019/0196950 A1* | 6/2019 | Ranganathan | G06F 11/3692 |
| 2019/0213115 A1* | 7/2019 | Takawale | G06F 8/30 |
| 2019/0213116 A1* | 7/2019 | Kulkarni | G06F 11/3664 |
| 2019/0243742 A1* | 8/2019 | Natari | G06F 11/3608 |
| 2020/0034281 A1* | 1/2020 | Hamid | G06N 20/00 |

OTHER PUBLICATIONS

Tariq M. King, Legend: An Agile DSL Toolset for Web Acceptance Testing, 2014, pp. 409-412. https://dl.acm.org/doi/pdf/10.1145/2610384.2628048 (Year: 2014).*

Geant, Deliverable D8.1 Service Validation and Testing Process, 2016, pp. 1-50. https://www.geant.org/Projects/GEANT_Project_GN4-1/Documents/D8-1_Service-validation-and-testing-process.pdf (Year: 2016).*

Pallavi Pandit, Distributed Agile: Component-Based User Acceptance Testing, 2016, pp. 1-9. https://ieeexplore.ieee.org/stamp/stamp.jsp?tp=&arnumber=7570913&isnumber=7570858 (Year: 2016).*

Micheal Williams, Writing better user stories with Gherkin and Cucumber, 2017, pp. 1-8. https://medium.com/@mvwi/story-writing-with-gherkin-and-cucumber-1878124c284c (Year: 2017).*

* cited by examiner

TEST REUSE EXCHANGE AND AUTOMATION SYSTEM AND METHOD

TECHNICAL FIELD

The general concepts of the present disclosure relate generally to systems and methods for generating, modifying, and maintaining test code for use in user acceptance testing of software applications.

BACKGROUND

User Acceptance Testing (UAT) is a critical but often de-emphasized facet of software development. This testing is generally performed by either the business client for which an application is developed or the technical team that is responsible for the application development. These tests are frequently developed and performed manually. In most cases, the party responsible for UAT also develops their own executable scripts or test code to assist in the testing process. Because there are often similar development efforts in an organization, much of the developed test code can be similar across the organization. Thus, redundant code and duplicate effort to test the same functionality throughout different projects is common in an organization. This can be the case particularly if the organization is large and has many ongoing software development projects. Test Driven Development, Behavior Driven Development, and test script writing skills needed to generated test code and conduct UAT may be limited within an organization, especially when a specialized software testing environment is used.

As would be understood by one of ordinary skill in the art, redundant testing is a waste of organizational resources. Additionally, such testing can be inconsistent and result in lists of detected issues that could cause confusion and duplicate issue resolution efforts. It is therefore appreciated that a need exists for systems and methods for generating, modifying, and maintaining test code used to perform common UAT tasks within an organization.

SUMMARY

In UAT, testing procedures and protocols may be organized in a test case. A test case may include a textual representation of one or more tests to be performed. Test cases may also be associated with test code. Test code may be an automated script or similar executable file configured to perform the functions described in the test case. According to aspects of the present disclosure, a user may search a test case repository for existing test cases, write new test cases, and/or modify existing test cases and store those test cases in standardized formats. In some exemplary embodiments, test cases may be associated with skeletal test code (also referred to herein as "glue code"). Linking of skeletal test code with test cases enables UAT test case development for both end users (with test cases appearing as human readable or narrative text) and software developers. Some embodiments are configured to integrate with project and issue management software. Users may retrieve data related to prior software development projects from the project and issue management software in order to develop test cases and test plans. Results of executed test cases may be captured such that they are traceable back to software documentation records maintained in the integrated test and issue management software. This traceability allows for enhanced documentation in the testing process which can remediate testing failures.

In certain embodiments, code check functions and auto generation and validation of feature files may provide automated test capabilities. Exemplary embodiments may provide pre-defined templates and glue code for the application of various tests, a test case author-enabler, and automated template prefill and validation capabilities. In certain embodiments a complete test script may be generated from a user interface.

Exemplary embodiments may include a centralized repository of test cases that is searchable and permits a user to select, modify, and clone features of a selected test case for implementation in a new test. The user interface is configured such that it is usable for both a software development team and also a business team that will be a user of the tested software. Exemplary embodiments are configured such that a user can enter ad hock test scripts if desired test conditions are not available. Exemplary embodiments permit a user to run tests automatically against a feature file and view the test reports in a user interface.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
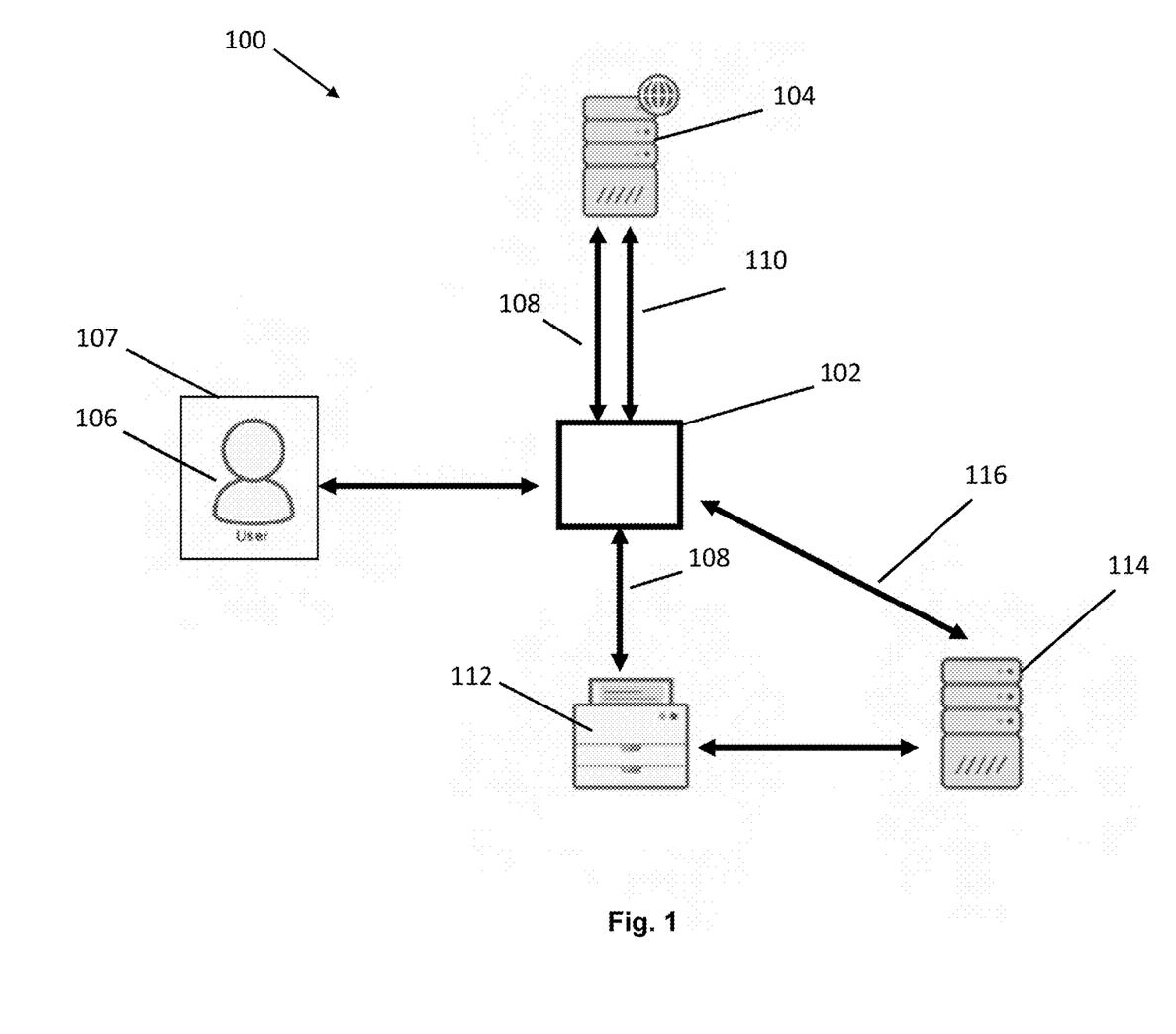
FIG. 1 is a diagram illustrating the components of a system for conducting user acceptance testing according to exemplary embodiments.

As is shown in FIG. 1, a system 100 for conducting User Acceptance Testing (UAT) is provided. The system 100 may be configured to generate, modify, and/or maintain executable test codes used in connection UAT. System 100 comprises at least a UAT module 102. A user 106, may access the UAT module 102 via a user device 107 e.g. a desktop computer, laptop computer, tablet computer, or the like. In some embodiments user 106 may access the UAT module 102 via a webpage, electronic portal, or the like. In some embodiments, UAT module 102 may comprise one or more processors in communication with a memory, wherein the processor is operable to execute instructions stored in the memory. The UAT module 102 may be in electronic communication with an issue and project management system 104. For example, UAT module 102 may connect to the issue and project management system 104 via a network connection, e.g. Internet or intranet connection. In certain embodiments, the issue and project management system 104 is integrated with the UAT module 102. In some exemplary embodiments, issue and project management system 104 may be implemented via one or more software programs, such as Jira (available from Atlassian Software, Sydney, Australia). In certain embodiments, UAT module 102 is configured to access the issue and project management system 104 via an electronic portal or the like.

A user 106 may communicate with issue and management system 104 directly or through UAT module 102. User 106 may communicate with the issue and project management system 104 to develop a list of operating requirements applicable to a software application in need of UAT or related testing. In some embodiments, the operating requirements may be automatically generated by the issue and project management system 104 based on a recognized user profile or subject software application. Operating requirements may be useful to define the scope and features of a software application or project to be developed and/or tested during the software development and coding process. In some embodiments, issue and project management system 104 may contain "stories" or human readable test cases. Test cases may have an associated acceptance criteria which can be packaged into an importable set of test cases and associated with one or more stories.

When coding of the software application is sufficiently complete or is otherwise ready for UAT, the operating requirements may be communicated to the UAT module 102 where a feature file 108 may be automatically generated. In some embodiments, the feature file 108 is generated based on one or more the operating requirements. Feature file 108 may contain executable code, e.g. test scripts, test code, glue code, etc. configured to execute certain automated testing methods or procedures. In certain embodiments feature file 108 may be configured to execute certain testing scenarios that may be used to control testing performed on a target software application undergoing testing. In some embodiments, feature file 108, and any associated testing method, procedures, or scenarios, may be compatible with software applications regardless of what software language the application is written in. This may reduce the resources required to conduct testing, for example, by eliminating the need for a tester to be familiar with the particular software language used in the coding process.

UAT module 102 may be further configured to generate a test parameters file 110. Test parameters file 110 may include one or more parameters associated with a desired test. Test parameters may be a set or range of values associated with a feature or test. Test parameters may be passed as single (scaler), tabular, or hierarchical values. The feature file 108 and test parameters file 110 may be transmitted to the issue and project management system 104 and/or to a repository 112. Repository 112 may store feature files or test parameter files used in previous projects. In some embodiments, repository 112 may be further configured to store additional data related to UAT, such as, but not limited to, historical test results, operating environments used, and error logging. In some embodiments, feature file 108 may be provided to an automation server 114 for execution and performance of the testing associated with the feature file 108. Automation server 114 may be implemented using an open source automation server, e.g. JENKINS, available from https://Jenkins.io. Automation server 114 may provide data related to the execution of the feature file 108, e.g. test results 116 to the UAT module 102 and/or the repository 112. It will be appreciated that UAT module 102, issue and project management system 104, repository 112, and automation server 114 and their various functions may be implemented using one or more servers in communication over a network, e.g. the Internet or intranet network.

Figure 2:
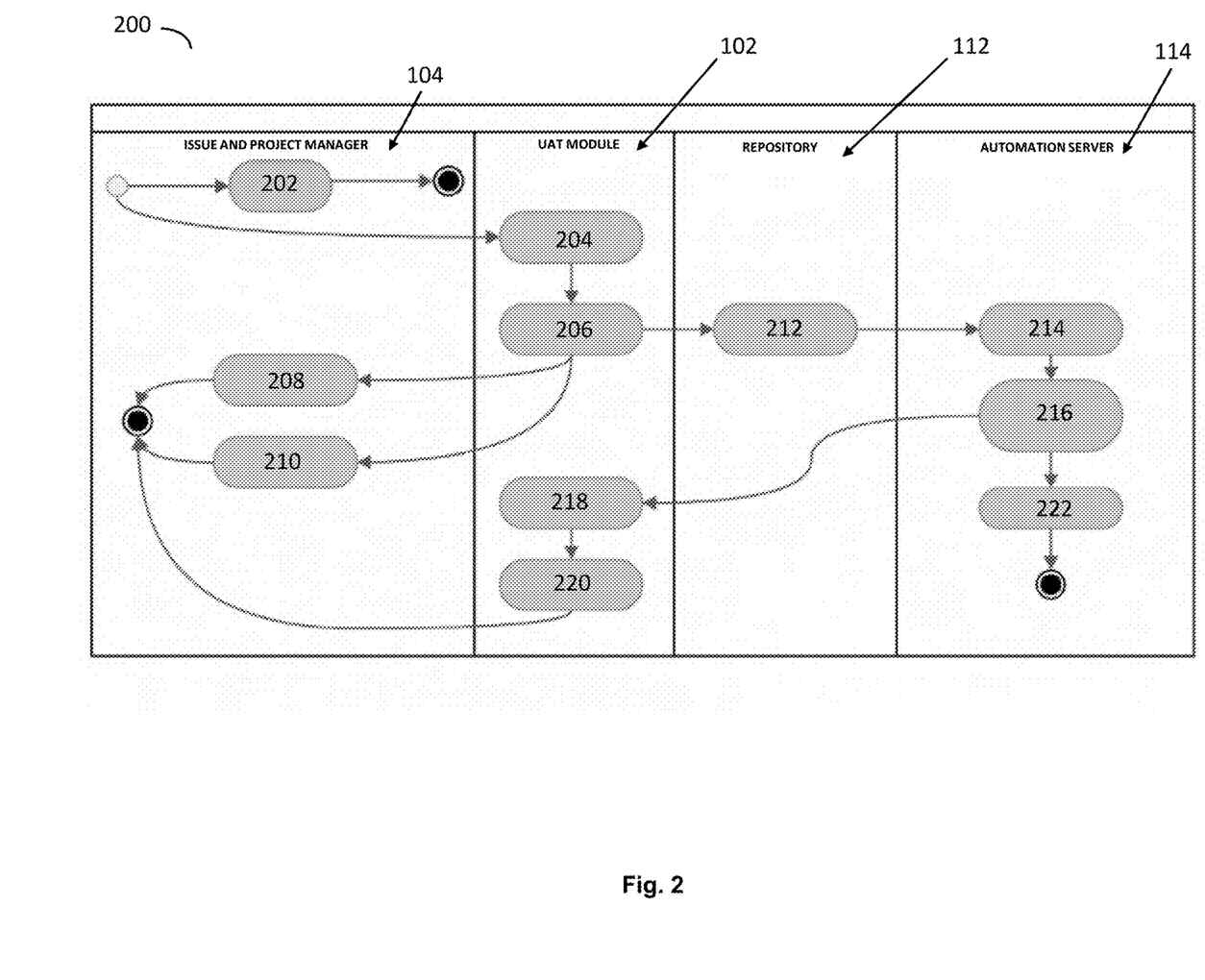
FIG. 2 is a swim lane diagram illustrating the flow of data between the various components of an exemplary embodiment.

An exemplary UAT process is further illustrated in the swim lane diagram 200 of FIG. 2. It will be appreciated that the illustrated process and associated steps may be performed in a different order, with illustrated steps omitted, with additional steps added, or with a combination of reordered, combined, omitted, or additional steps. The process may begin at step 202 with the receipt of a UAT request at the issue and project management system 104. As shown at step 204, a selection of testing that is desired to be performed is received at the UAT module 102. The UAT module 102 may comprise a user interface configured to receive selections from a user. Test selection may include selecting one or more tests that have previously been performed, creating a new test, or cloning portions of previous tests to form a new test. At step 206 the UAT module 102 may generate a feature file 108 and transmit the file to the issue and project management system 104 and/or the repository 112. Also at step 206, a test parameters file may be transmitted by the UAT module 102 and received by the issue and project management system 104 at step 210. At step 208 the feature file 108 may be received by the issue and project management system 104.

At step 212, the feature file 108 may be received at the repository 112. The feature file 108 may then be received by the automation server 114 at step 214. The automation server 114 may then execute testing on a software application according to the instructions found in the feature file 108 at step 216. Test results associated with the execution of the feature file 108 may then be received at the UAT module 102 at step 218. At step 220, The UAT module 102 may then provide the test results to the issue and project management system 104 for storage such that the results can be associated with software requirements documents, the feature file 108, and/or test parameters related to the testing. By providing the test results back to UAT module 102 and issue and project management system 104, traceability from the software requirements documents to test results is greatly enhanced. This may significantly reduce the cost of audit remediation. At step 222, the test results may be displayed at automation server 114.

Typical software development environments conducting user acceptance testing may utilize an Application Lifecyle Management (ALM) tool for requirements management. An ALM tool can provide software requirements information to a quality assurance (QA) engineer. Once a development team has submitted a project for UAT, the QA engineer must manually create new, edit, or clone existing test cases for that individual project. This testing is generally developed without the benefit of other test cases because the QA engineer must create new test cases for each project. In addition, if another team in the organization wishes to perform similar UAT, they are generally required to produce new test cases specifically for their project. Thus, it is likely that there would be duplicative effort and redundant testing, which wastes valuable time and resources.

Figure 3:
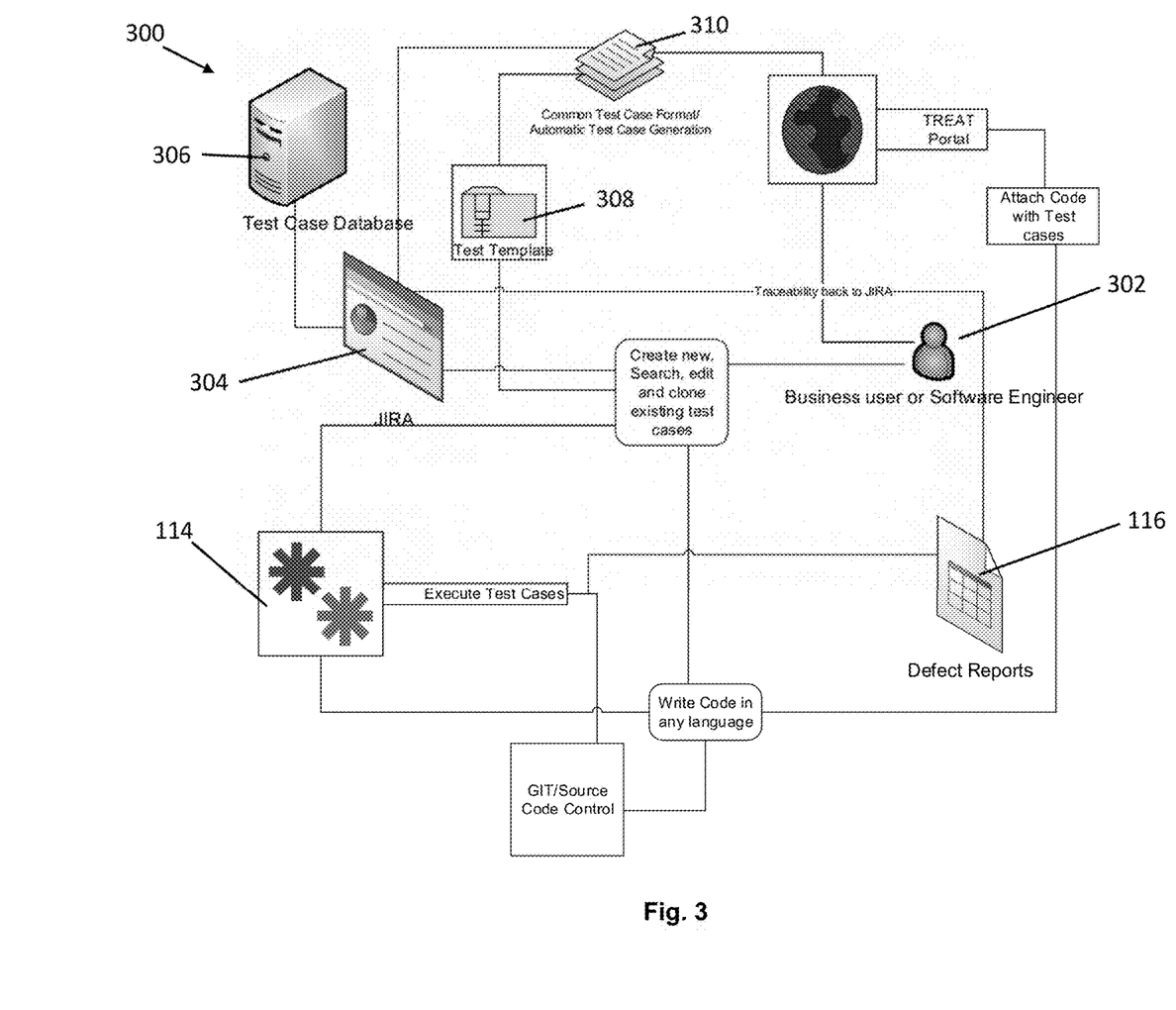
FIG. 3 is a diagram illustrating a method of developing and executing user acceptance tests according to an exemplary embodiment.

As is illustrated in the functional diagram 300 of FIG. 3, a user 302 may interact with a user interface to retrieve test cases from a test case repository 306. The user interface may display test cases as a list. In some embodiments, existing test cases may be automatically suggested to a user based on user activity, the software project to be tested, or other information related to the user or the software project to be tested. In certain embodiments, test cases are associated with or mapped to test code automatically. Certain test code may be in the form of skeletal code or glue code, that may be easily integrated with various test cases. The association between test cases and test code may be accomplished automatically according to test parameters input by user 302. The test cases may be modified and/or cloned to produce a new test case. A plurality of test cases may be combined into a test plan or test scenario. Additional test code may be associated with a test plan based on the included test cases. In some embodiments, the user interface 304 may be provided by issue and project management system 104. In other embodiments, the user interface is provided by a UAT module 102. In some embodiments, user 302 may use a test template 308 or automated test case generator 310 to generate new test cases. In some embodiments, user interface 304 may provide an automated template prefill function that provides a user with partially or fully populated test templates. Users may also add test conditions or executable scripts in an ad-hock manner in order to test software functionality that was not contemplated by prior tests or test templates. These test cases may then be executed using an automation server 114. In some embodiments, test cases may be associated with a feature file 108, which may be executed by the automation server 114 to conduct testing activity. Defects and/or errors associated with testing may be displayed to user 302 in a test report 116, which may be provided to the issue and project management system 104. In some embodiments, validation may be performed after testing is complete to ensure that any errors or defects have been detected. By providing a test case repository 306 and test templates 308 to users 302, the need for a QA engineer to manually create new test cases for each project to be tested is eliminated and unnecessary duplicative effort is avoided.

Figure 4:
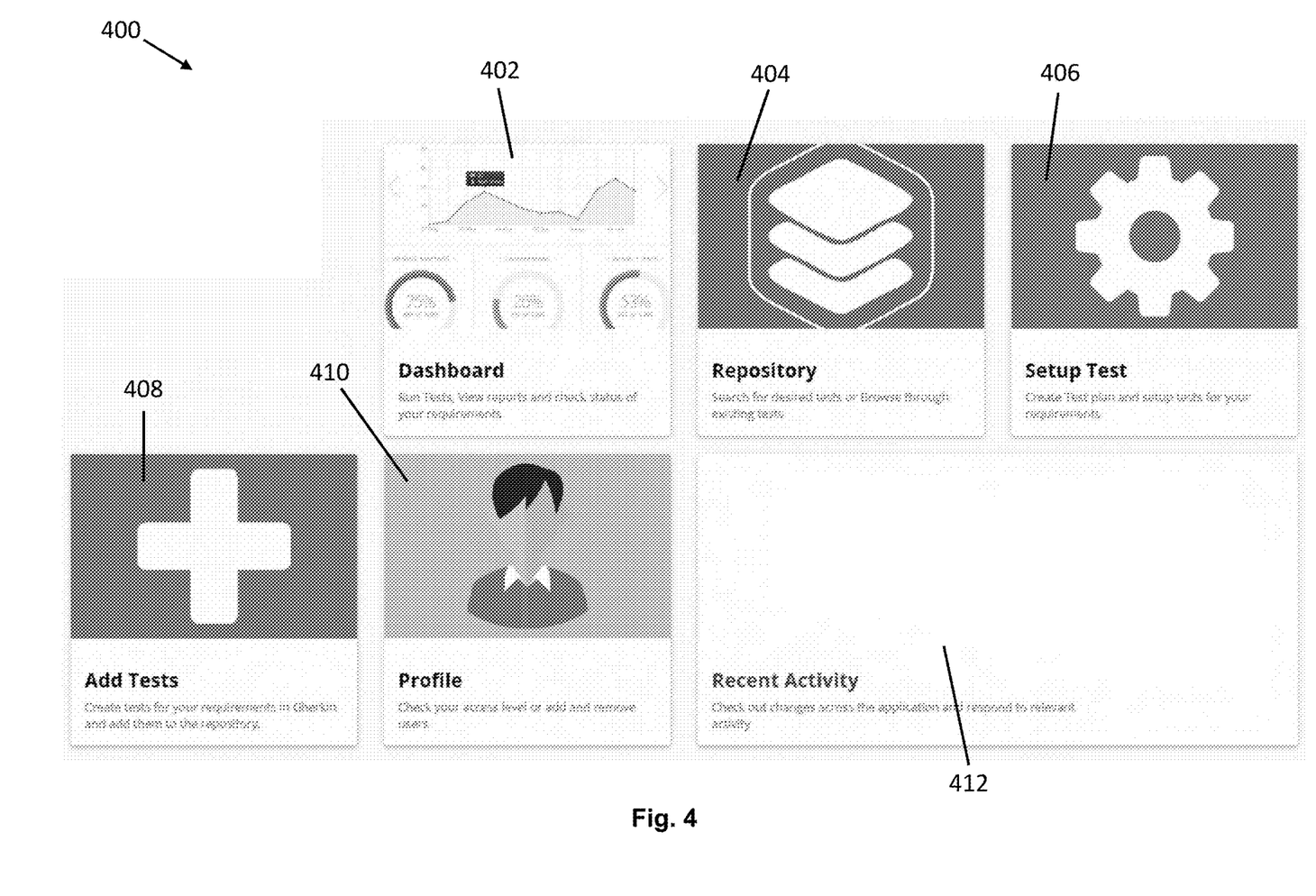
FIG. 4 is a user interface produced by an exemplary embodiment.

FIG. 4 shows an exemplary user interface 400 according to the various embodiments of the present disclosure. The user interface 400 may comprise a dashboard 402, a searchable repository 404 of existing tests, and a test setup tool 406 that assists a user with the task of creating test cases and/or test plans and setting up tests according the various project requirements. The user interface 400 may also comprise a test editor 408 configured to create new tests, edit existing tests, or add ad-hock test functions prior to the execution of a test. Exemplary embodiments may also comprise a user profile viewer and editor 410 and a display of recent user activity 412. In certain embodiments, user interface 400 is configured to display a feed of test results of related test cases. The feed of test results may be displayed in real-time or near real-time. In some embodiments the feed may show scheduled testing of related test cases to further reduce likelihood of test duplication.

Figure 5:
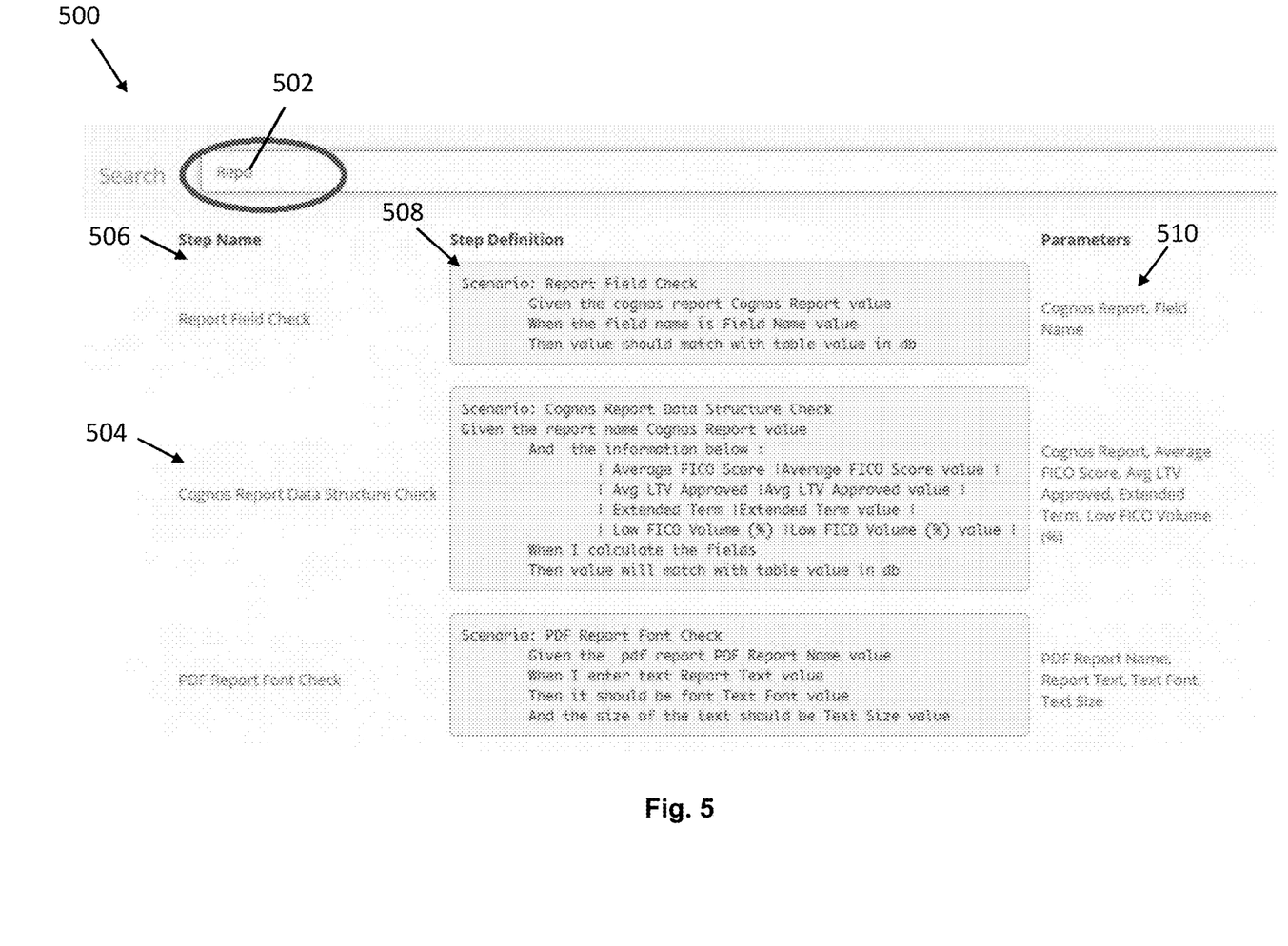
FIGS. 5 and 6 are user interfaces illustrating a user acceptance step search function according to an exemplary embodiment.
Figure 6:
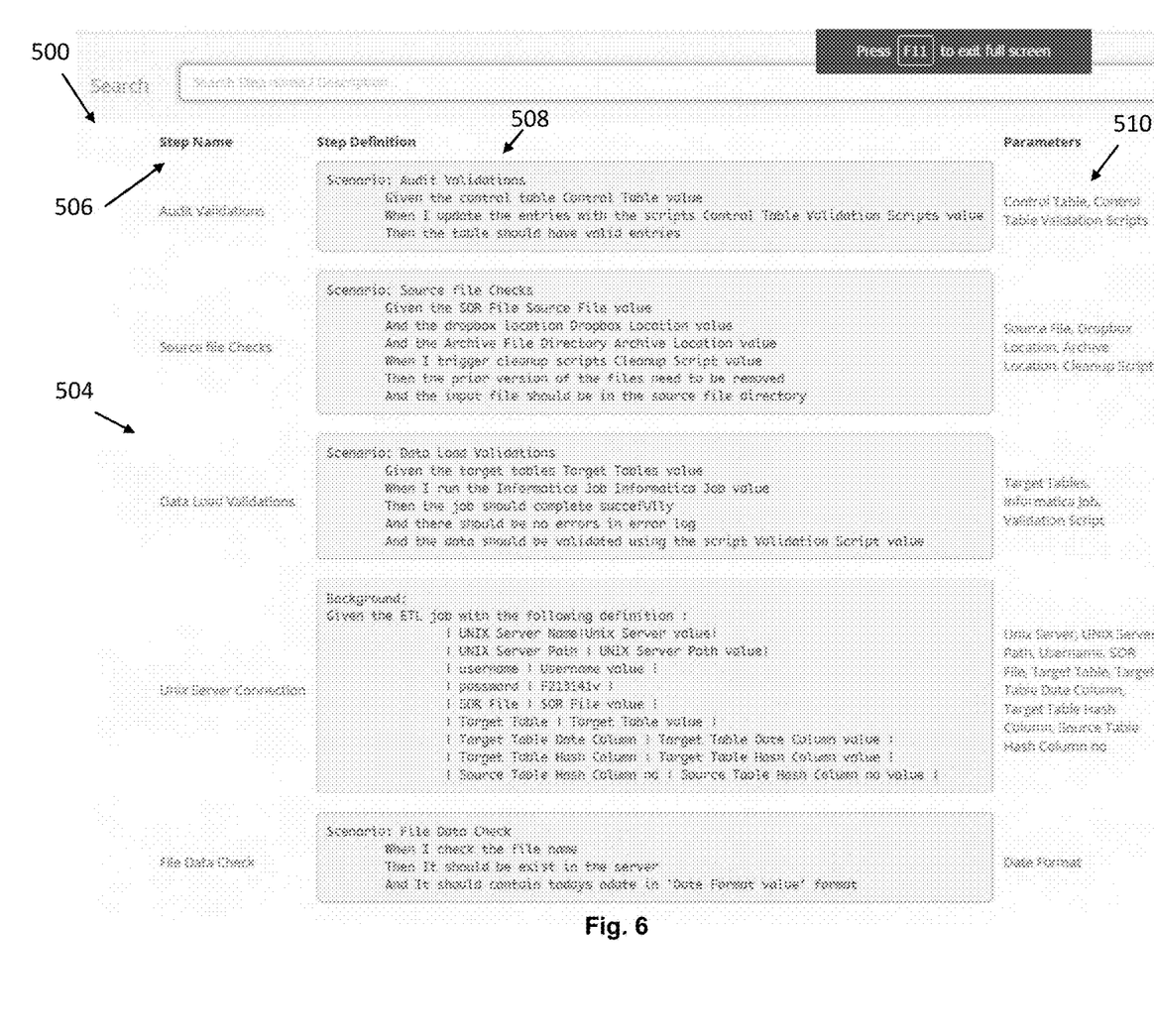

Some exemplary embodiments are configured such that users can search a library of test steps. Test steps may be stored in a data repository, e.g. repository 112. These test steps can be combined to create new test cases and/or test plans. In order to locate these tests, a user may enter various search terms into a search dialog box. In some embodiments, Boolean search terms may be used to further narrow the search results. The results 500 of repository searches according to an exemplary embodiment are shown in FIGS. 5 and 6. As shown, a user may enter a search term 502 and view test steps 504 returned as a result of the search terms entered.

As is shown, an exemplary embodiment displays step names 506, step definitions 508, and parameters 510 used by the steps 504. The user may select these steps to build and store a new test case or test plan for later use.

Figure 7:
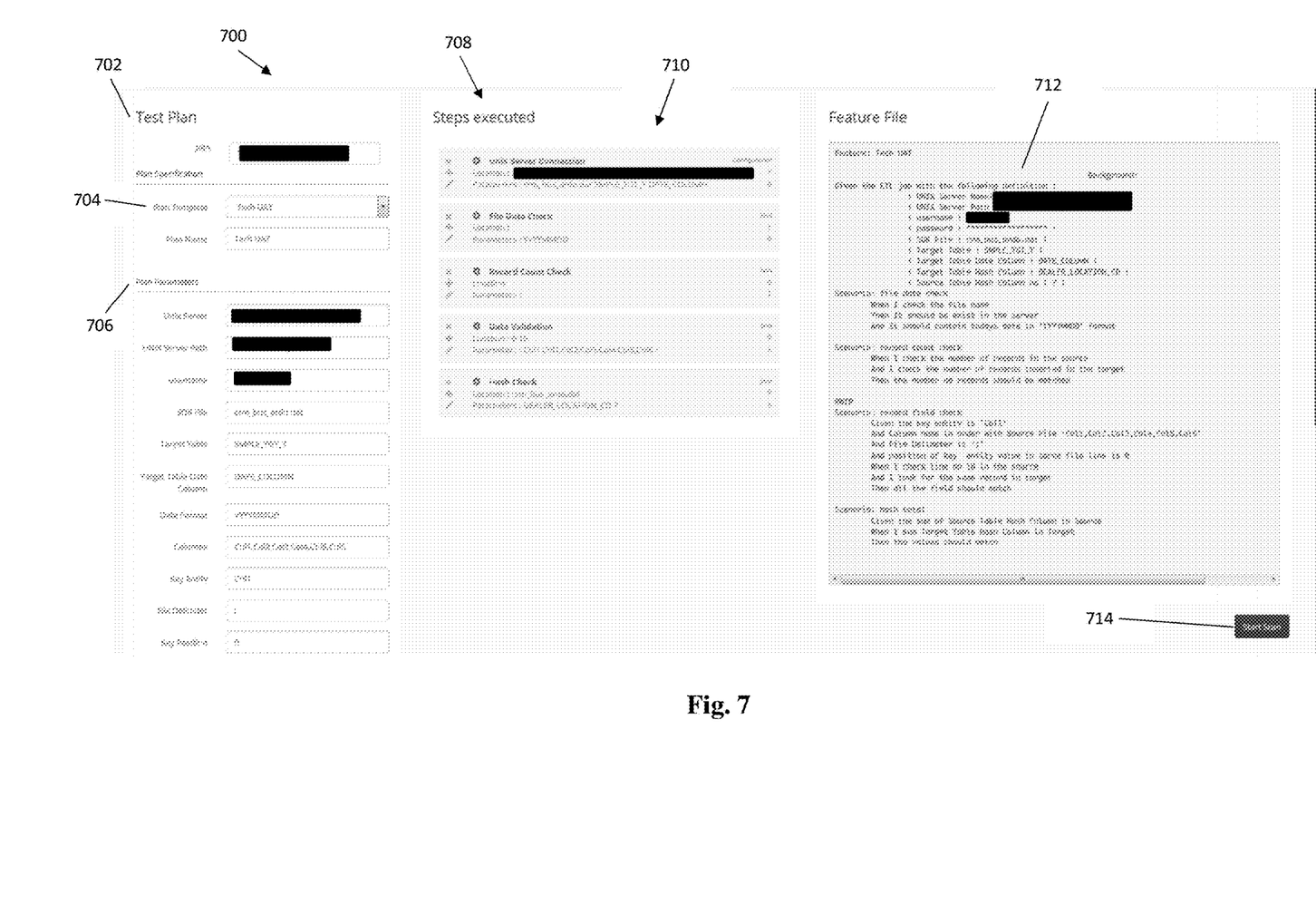
FIG. 7 is a test setup and execution user interface according to an exemplary embodiment.

An illustration of a test setup user interface 700 according to an exemplary embodiment is shown in FIG. 7. A test plan section 702 displays various details regarding a test plan. This might include such details as the template used 704 and test plan parameters 706. The interface 700 may further display a listing of steps executed 708 including specific details 710 of each step. As is shown, some exemplary embodiments may display details of the feature file 108 as shown at 712. In some exemplary embodiments, a user may select a "start scan" control 714 which causes a UAT to be performed directly from the test setup user interface 700.

The term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

What is claimed is:

1. A method for conducting user acceptance testing (UAT) related to a software project, the method comprising:
   receiving, by at least one processor via a user interface, at least one operating requirement related to a software project from a user;
   identifying, by the at least one processor from the software project, a computing language;
   generating a feature file based on the at least one operating requirement, wherein the feature file comprises at least one executable test instruction configured to perform testing of the software project, and wherein the at least one executable test instruction is compatible with the identified computing language;
   executing the at least one executable test instruction;
   storing, by the at least one processor, test results based on the executed at least one executable test instruction in at least one memory;
   associating, by the at least one processor, the test results with a corresponding software requirements document, a corresponding feature file, and a corresponding test parameter for software development documentation relating to lifecycle traceability;
   persisting, by the at least one processor in a repository, the generated feature file;

receiving, by the at least one processor via the user interface, at least one new test condition and at least one new executable script from the user, the at least one new test condition and the at least one new executable script including a software functionality that is not included in the at least one executable test instruction;

retrieving, by the at least one processor from the repository, the persisted feature file; and generating, by the at least one processor, a new feature file by using the persisted feature file, the at least one new test condition, and the at least one new executable script.

2. The method according to claim 1, wherein the feature file is generated based on a test case, wherein the test case is associated with test code.

3. The method according to claim 2, wherein the feature file is generated based on the at least one operating requirement and the test case.

4. The method according to claim 3, further comprising generating a modified test case based on the test results and storing the modified test case.

5. The method according to claim 1, further comprising modifying the at least one executable test instruction before execution.

6. The method according to claim 1, further comprising displaying the test results of the executed at least one executable test instruction at the user interface.

7. The method according to claim 1, wherein the at least one executable test instruction is executed at an automation server.

8. A method for performing user acceptance testing (UAT) related to a software project via a user interface, the method comprising:

displaying, by at least one processor via the user interface, a list of test cases;

automatically suggesting, by the at least one processor via the user interface, at least one test case based on information relating to a user profile that includes a history of activities by a user and data relating to the software project to be tested;

accepting a user selection of the at least one test case from the list of test cases;

associating test code with the selected at least one test case;

generating a prefilled test template based on the selected at least one test case and the associated test code;

displaying, by the at least one processor via the user interface, the prefilled test template corresponding to the associated test code;

receiving, by the at least one processor via the user interface, at least one new test condition and at least one new executable script from the user, the at least one new test condition and the at least one new executable script including a software functionality that is not included in the selected at least one test case;

generating, by the at least one processor, a new test case by using the prefilled test template, the at least one new test condition, and the at least one new executable script; and conducting user acceptance testing on the software project using the new test case.

9. The method according to claim 8, wherein the list of test cases is retrieved from a test case repository.

10. The method according to claim 8, further comprising modifying the selected at least one test case using a test template.

11. The method according to claim 8, further comprising modifying the selected at least one test case using an automated test case generator.

12. The method according to claim 8, wherein the user acceptance testing is executed at an automation server.

13. The method according to claim 8, further comprising displaying results related to the user acceptance testing of the software project.

14. The method according to claim 13, wherein the results are displayed in real-time.

15. A system for conducting user acceptance testing (UAT), the system comprising:

at least one processor;

at least one memory; and a UAT module stored in the at least one memory, the UAT module further configured to:

receive, by the at least one processor via a user interface, at least one operating requirement related to a software project from a user;

identify a computing language from the software project;

generate a feature file based on the at least one operating requirement, wherein the feature file comprises at least one executable test instruction configured to perform testing on the software project, and wherein the at least one executable test instruction is compatible with the identified computing language;

initialize execution of the at least one executable test instruction;

store, by the at least one processor, test results based on the executed at least one executable test instruction in the at least one memory;

associate, by the at least one processor, the test results with a corresponding software requirements document, a corresponding feature file, and a corresponding test parameter for software development documentation relating to lifecycle traceability;

persist, by the at least one processor in a repository, the generated feature file;

receive, by the at least one processor via the user interface, at least one new test condition and at least one new executable script from the user, the at least one new test condition and the at least one new executable script including a software functionality that is not included in the at least one executable test instruction;

retrieve, by the at least one processor from the repository, the persisted feature file; and generate, by the at least one processor, a new feature file by using the persisted feature file, the at least one new test condition, and the at least one new executable script.

16. The system according to claim 15, wherein the UAT module is further configured to access a test case from a test case repository, wherein the test case is associated with test code.

17. The system according to claim 16, wherein the feature file is generated based on the at least one operating requirement and the test case.

18. The system according to claim 16, wherein the UAT module is further configured to generate a modified test case based on the test results.

19. The system according to claim 16, wherein the UAT module is further configured to transmit the modified test case to a test case repository.

20. The system according to claim 15, further comprising an automation server for executing the at least one executable test instruction.

* * * * *